Feb. 9, 1943.  M. J. GAUSS  2,310,282
CYLINDER ADJUSTER FOR THRESHING MACHINES
Filed April 24, 1941  2 Sheets-Sheet 1
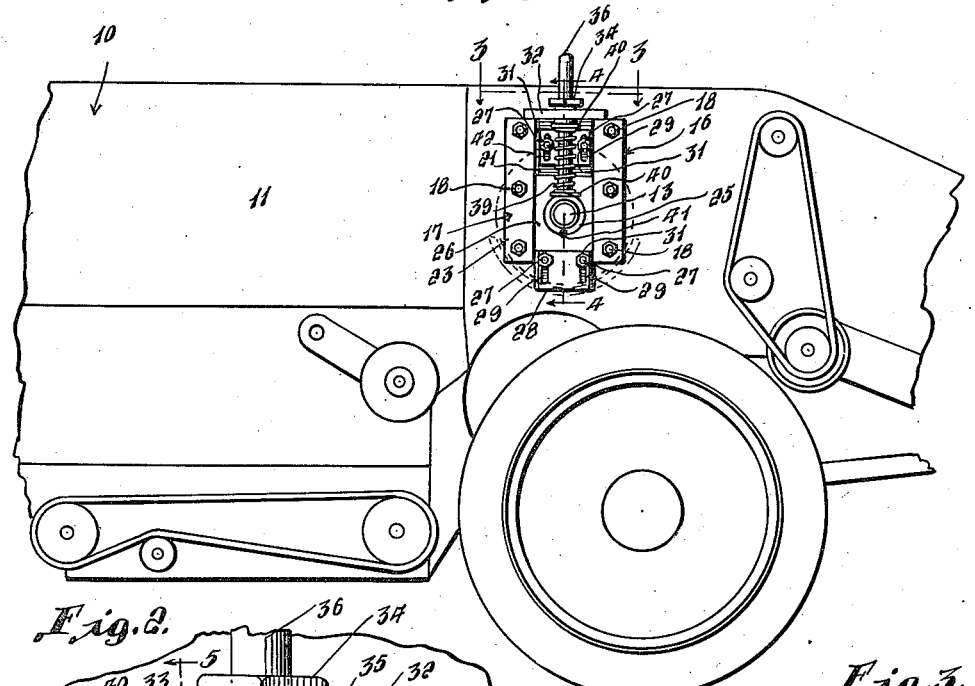
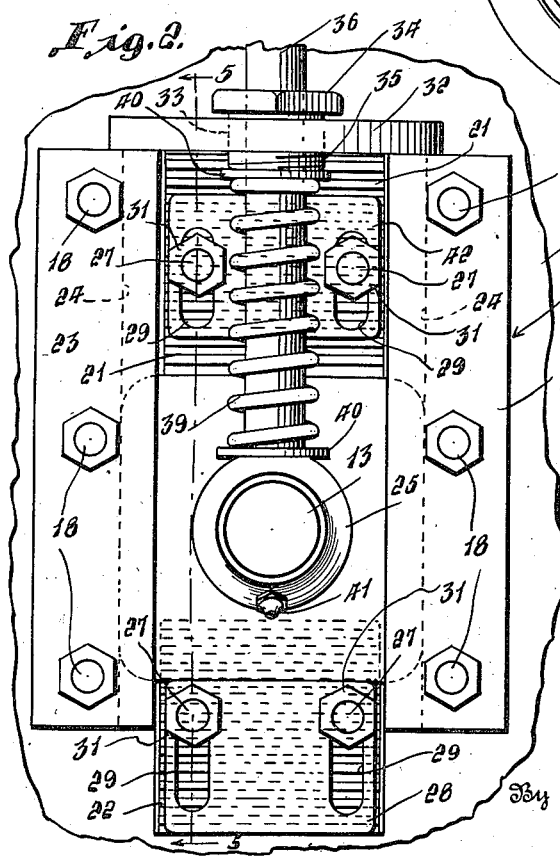
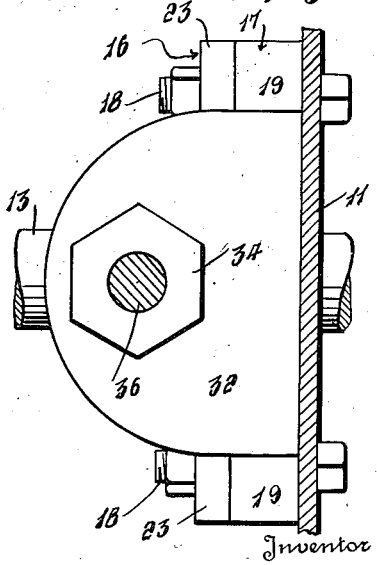
Inventor
Michael J. Gauss Feb. 9, 1943.  M. J. GAUSS  2,310,282
CYLINDER ADJUSTER FOR THRESHING MACHINES
Filed April 24, 1941  2 Sheets-Sheet 2
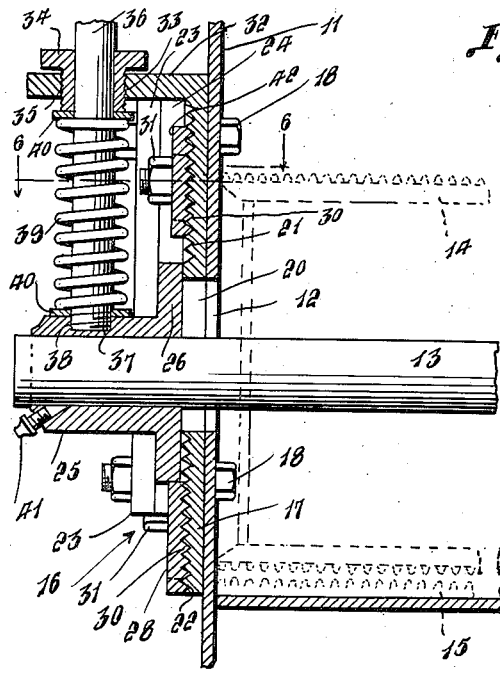
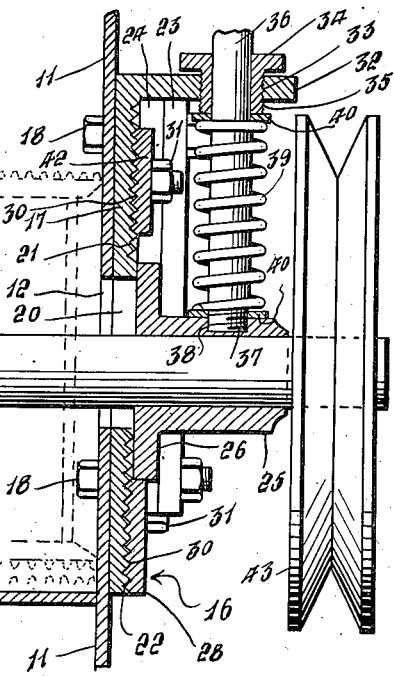
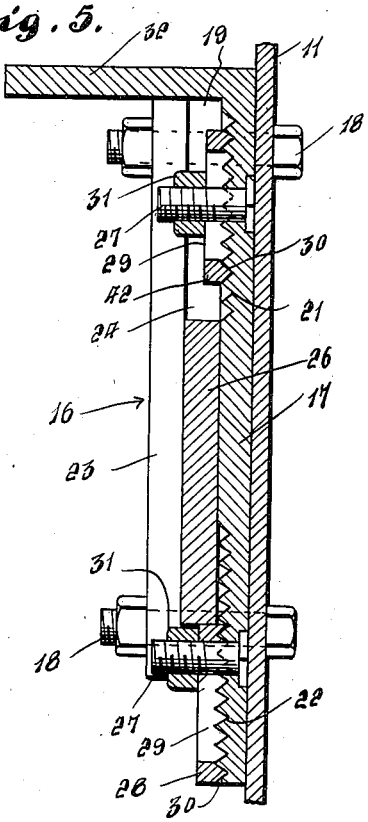
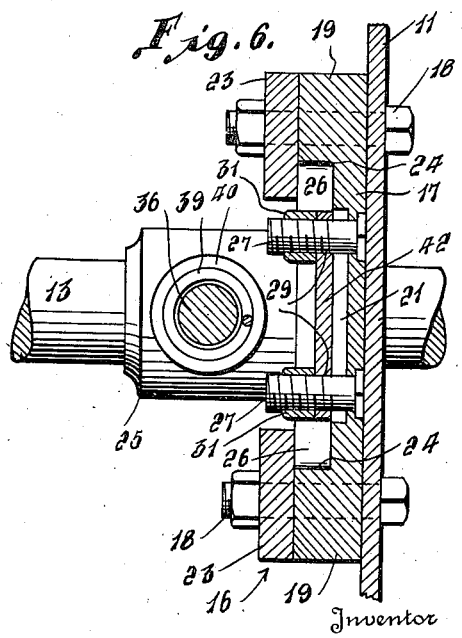
Inventor
Michael J. Gauss
By L. F. Faudrezle
Attorney Patented Feb. 9, 1943

2,310,282

UNITED STATES PATENT OFFICE 2,310,282

CYLINDER ADJUSTER FOR THRESHING MACHINES

Michael J. Gauss, Weskan, Kans.

Application April 24, 1941, Serial No. 390,180

4 Claims. (Cl. 308—33)

This invention relates to an attachment for threshing machines and combines, and more particularly to an attachment for providing an adjustable mounting for a cylinder of a thresher to permit the cylinder to be adjustably positioned relatively to the thresher concave and grate.

More particularly, it is an aim of the invention to provide an adjustable mounting for thresher cylinders which will prevent the cylinder from being slowed down and clogged by bulky bunches of grain to an extent that the grain is not threshed out of the head or the seed cleaned properly.

Still a further aim of the invention is to provide an attachment that will enable the cylinder to run at a uniform speed and will avoid excessive loads on the driving means of the cylinder, by allowing bulky bunches of grain to pass between the cylinder and concave without clogging the cylinder and without slowing down the speed of its rotation thus avoiding the necessity of stopping the machine to clean the cylinder and maintaining the cylinder sufficiently clean at all times so that it can function efficiently.

More particularly, it is an aim of the invention to provide means attached to the outer sides of the side walls of a threshing machine for supporting bearings for journaling the ends of the shaft of a thresher cylinder, said means being arranged to adjustably support the bearings and shaft for adjustably positioning the cylinder relatively to the concave, and also including means for permitting the bearings to yield upwardly to thereby permit the cylinder to yield upwardly or away from the concave in order to allow bulky bunches of grain to pass therebetween.

Other objects and advantages of the invention will hereinafter become more fully apparent from the following description of the drawings, which illustrate a preferred embodiment of the invention, and wherein:

Figure 1 is a side elevational view of a portion of a conventional threshing machine, showing the invention applied thereto, Figure 2 is an enlarged side elevational view of the attachment, Figure 3 is an enlarged horizontal sectional view taken substantially along the plane of the line 3—3 of Figure 1, and showing the attachment in top plan, Figure 4 is an enlarged vertical sectional view taken substantially along the plane of the line 4—4 of Figure 1, Figure 5 is a vertical sectional view taken substantially along the plane of the line 5—5 of Figure 2, and Figure 6 is an enlarged horizontal sectional view taken substantially along the plane of the line 6—6 of Figure 4.

Referring more particularly to the drawings, wherein like reference characters designate like or corresponding parts throughout the different views, 10 designates generally a portion of a conventional threshing machine or combine having side walls 11 provided with elongated vertically disposed openings 12, as best seen in Figure 4, through which are adapted to loosely extend the shaft 13 of a threshing cylinder 14, as shown in dotted lines, which is disposed within the machine 10, between its sides 11, and above a concave 15, likewise shown in dotted lines. The parts 14 and 15 are of conventional construction and form no part of the present invention but are merely illustrated and described for the purpose of better illustrating the invention, designated generally 16.

The attachment, designated generally 16, comprises a device for adjustably and yieldably mounting the cylinder 14 relatively to the concave 15, and as seen in Figure 4, an attachment 16 is attached to each side wall 11 and connected to each end of the shaft 13. As the attachments 16 are identical in construction, only one of the attachments will be described.

The attachment 16 includes a bracket or plate 17 which is attached to the outer side of a wall 11 by means of a plurality of nut and bolt fastenings 18. As best seen in Figure 6, the bracket or plate 17 is provided with thickened side edge portions 19 which project outwardly beyond the intermediate portion of the bracket 17 and through which the bolts of the fastenings 18 extend. The side edge portions 19 are perpendicularly disposed and are provided for a purpose which will hereinafter become apparent. The plate 17, intermediate of its side edges and ends, is provided with an elongated opening 20, which registers with the opening 12, and through which an end of the shaft 13 is adapted to extend. The outer side of the intermediate portion of the plate 17, above the opening 20, is provided with horizontally disposed teeth or serrations 21, and beneath the opening 20 the outer side of the intermediate portion of the plate 17 is similarly toothed or serrated, as seen at 22.

A bar 23 is attached to the outer face of each of the enlargements 19 by the fastenings 18. The inner edges of the bars 23 project inwardly beyond the inner edges of the enlargements 19 to combine with portions of the intermediate portion of the plate 17 to form perpendicular, inwardly opening grooves 24, as best seen in Figure 6. One end of the shaft 13 is journaled in a bearing 25 which is provided at its inner end with a flange or head 26, the side edges of which slidably engage the grooves 24 to slidably mount the bearing 25 to permit it to move perpendicularly.

A pair of horizontally alined bolts 27 project outwardly from each of the serrated portions 21 and 22. A block 28 is provided with elongated openings 29 for loosely engaging the lower pair of bolts 27 to permit the block 28 to be adjusted vertically relatively to the serrated portion 22. The inner face of the block 28 is provided with horizontally disposed teeth or serrations 30, corresponding to the serrations 22 and which are adapted to mesh therewith. The outer ends of the bolts 27 are threaded to receive nuts 31 for securely positioning the block 28 against the lower portion of the plate 17 so that the block 28 will be held in adjusted position by means of the intermeshed teeth 22 and 30. The lower edge of the head or flange 26 rests on and is supported by the upper edge of the block 28 so that the block 28 provides means for adjustably supporting the cylinder 14 relatively to the concave 15.

As best seen in Figures 2 and 3, the bracket 17 is provided with an outwardly projecting flange 32 at its upper edge which is provided with a threaded opening 33, as best seen in Figure 4, for receiving a bushing 34 which is provided with a threaded annular portion 35 for engaging the threaded opening 33. A rod 36 is slidably mounted in the bore of the bushing 34 and is provided with a lower threaded end 37 for engaging a threaded upwardly opening recess 38 in the bearing 25, adjacent the outer end thereof. An expansion coil spring 39 is carried by the rod 36, between the bushing 34 and the bearing 25 for urging the bearing downwardly. Washers 40 are disposed between the ends of the coil spring 39 and the bushing 34 and bearing 25, as seen in Figure 1, and form abutments for the ends of the spring. The bearing 25 is preferably provided with a "Zerk" or similar lubricating fitting 41, as seen in Figure 1.

An abutment block 42, which corresponds to the block 28 and which is provided with openings 29 and teeth 30 is attached to the upper pair of bolts 27 and is held applied thereto by nuts 31 to form an abutment to be engaged by the upper edge of the head 26 to limit the upward movement of the bearing 25.

From the foregoing it will be obvious that by providing an attachment 16 for mounting each end of the shaft 13 that the cylinder 14 may be adjusted toward and away from the concave 15 depending upon the size of the bundles of grain which are to be passed therethrough. Also, it will be apparent that the cylinder 14, by means of the springs 39, can yield upwardly to permit the passage of large bundles of grain between the cylinder and the concave without having the space therebetween clogged by the grain.

A pulley 43, forming no part of the invention, is attached to one end of the shaft 13 and is adapted to be connected by a belt, not shown, to suitable driving means for revolving the cylinder 14, which belt may be provided with yieldable tensioning means, if desired, of conventional construction, to maintain a substantially uniform tension on the belt regardless of the adjustment of the shaft 13. However, as only a very slight movement of the shaft 13 is necessary under ordinary conditions no adjustment of the belt will be required.

Various modifications and changes are contemplated and may obviously be resorted to as only a preferred embodiment of the invention has been disclosed.

I claim as my invention:

1. A mounting means for thresher cylinders comprising a bracket adapted to be attached to the outer side of a side wall of a threshing machine, said bracket being provided with an elongated perpendicularly disposed opening adapted to aline with a corresponding opening in the side wall of the machine and through which is adapted to loosely extend the shaft of a threshing cylinder, a bearing for journaling the shaft, adjustable means connected to the lower portion of the bracket and arranged to be adjusted vertically relatively thereto and forming a support for the bearing for adjustably mounting the shaft and its cylinder, spring means associated with said bracket for yieldably urging the bearing downwardly, an abutment member adjustably connected to the upper portion of the bracket and arranged to be adjusted vertically relatively thereto for limiting the extent to which said bearing can yield upwardly.

2. An attachment for supporting and yieldably mounting a threshing cylinder shaft, comprising a bracket adapted to be detachably fastened to the outer side of a side wall of a threshing machine and provided with an elongated upright opening adapted to register with a corresponding opening in said side wall, said bracket having a serrated portion beneath the opening, a plate mounted for adjustment vertically on the outer side of the lower part of the bracket and having a serrated face to mesh with said serrated portion for retaining the plate in adjusted position, a bearing disposed on the outer side of the bracket to journal a thresher cylinder shaft which extends through and is mounted to slide vertically in said opening, said bracket having channel portions forming guides for slidably mounting the bearing for vertical movement, an adjustable abutment for the bearing at the upper end of the bracket, a part adjacent the upper end of the bracket overhanging said bearing and expansion spring means disposed between the said part and bearing for urging the bearing downwardly against said plate and for yieldably urging the shaft downwardly.

3. A support as in claim 2, a plate mounted for adjustment vertically on the outer side of the upper portion of the bracket to limit upward movement of the bearing, between its opening and abutment, said upper portion and last mentioned plate having interengaging serrated faces to hold the last mentioned plate in adjusted position.

4. An attachment as set forth in claim 2 wherein the channel portions are provided by spaced apart edge portions on the bracket, said edge portions being of greater thickness than the adjacent portions of the bearing, and plates fastened to the side portions and overlapping the bearing.

MICHAEL J. GAUSS.